(12) United States Patent
Nakatani

(10) Patent No.: US 6,911,979 B2
(45) Date of Patent: Jun. 28, 2005

(54) DERIVED DATA DISPLAY ADJUSTMENT SYSTEM

(75) Inventor: Rintaro Nakatani, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 154 days.

(21) Appl. No.: 10/005,032

(22) Filed: Dec. 4, 2001

(65) Prior Publication Data

US 2002/0085036 A1 Jul. 4, 2002

(30) Foreign Application Priority Data

Dec. 26, 2000 (JP) ........................................ 2000-395257
Feb. 2, 2001 (JP) ........................................ 2001-026370

(51) Int. Cl.⁷ .......................... G09G 5/22; G11B 27/00; H04N 5/44; H04N 7/173
(52) U.S. Cl. .................... 345/440.1; 715/719
(58) Field of Search ............................. 345/440, 440.1, 345/441, 442, 716, 719, 800; 378/80; 715/716, 719, 800

(56) References Cited

U.S. PATENT DOCUMENTS 4,821,303 A * 4/1989 Fawcett et al. ............... 378/80
5,247,468 A 9/1993 Henrichs et al. ............. 364/578
5,579,462 A * 11/1996 Barber et al. ................ 345/440
5,623,282 A 4/1997 Graham et al. .............. 345/121
6,262,728 B1 * 7/2001 Alexander ................ 345/440.1

FOREIGN PATENT DOCUMENTS

WO    99028811    6/1999

* cited by examiner

Primary Examiner—Matthew C. Bella
Assistant Examiner—Aaron M. Richer
(74) Attorney, Agent, or Firm—Adams & Wilks

(57) ABSTRACT

A derived data display adjustment system for a sample analyzer allows user selection of one or more displayed images to be subjected to a derived data calculation process. A derived data user interface is displayed on a display screen in response to user selection of one or more displayed images to enable user selection of a derived data calculation process. A determination is made as to whether or not display of the derived data may be achieved without interfering with other displayed images. If not, a derived data adjustment user interface is displayed to enable a user to select a convenient display location for display of the derived data.

3 Claims, 5 Drawing Sheets

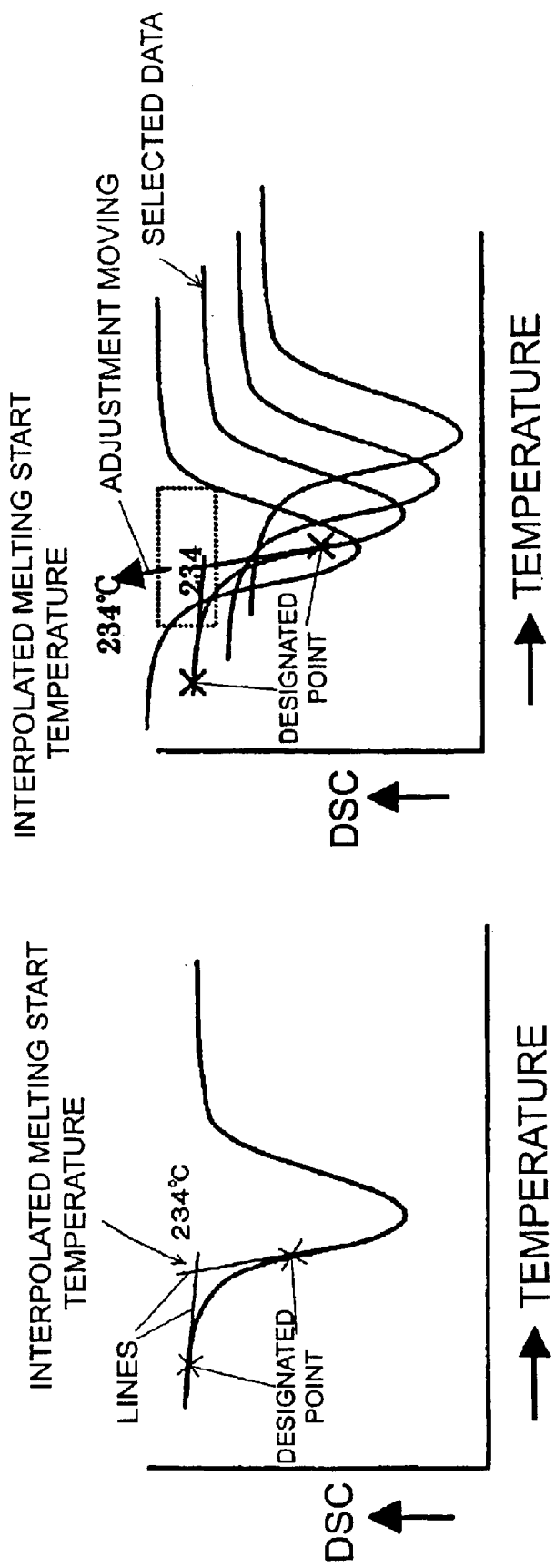

DERIVED DATA DISPLAY ADJUSTMENT SYSTEM

BACKGROUND OF THE INVENTION

The present invention relates to a system for adjusting a displayed image showing analysis results by graphically displaying a plurality of data stored in a computer, while at the same time, calculating the derived data and displaying the data so that image elements will not overlap on the screen.

It is well known in the related art that detected data obtained by analysis apparatus is stored in a computer and the analysis results are finally executed in a report form as a result of computer operation by displaying the data on a display or processing the data. In thermal analysis, which is one field of physical analysis, it is performed as a routine operation to input and store the detected data in a computer, graphically display the data on a display to understand and analyze the detection results, and calculate and graphically display the derived data from the detected data. That is to say, each detector and the computer are connected by a data line, and a program for thermal analysis data processing is prepared in a memory of the computer, which has an operational function of performing calculation or statistical processing of various derived data calculated from the detected data, and a function of displaying the various obtained data on a display, and thus, with the analysis apparatus therefore being constituted by the whole system including the detection means, the computer and peripheral equipment. A Differential Scanning Calorimeter (DSC), which a typical measuring apparatus for thermal analysis, is widely used for analysis of sample melting, glass transitions, heat history, crystallization, hardening reaction, Curie point, oxidation stability, heat instability and others. Calculation of derived data and graphical display thereof will be described using a method stipulated in JIS K 7121 for calculating an extrapolated melting start temperature for plastic from a DSC curve, as an example. An extrapolated melting start temperature is obtained as a temperature corresponding to a point of intersection of a tangent for a stable region of a lower temperature side of DSC curve and a tangent in the vicinity of the maximum inclination on the lower temperature side of the curve. In a method that is well known and broadly utilized, when the DSC curve shown in FIG. 3A is displayed and the user determines points (mark x) on the screen for stable regions positioned on both side of inflection on the lower temperature side of the curve, and specifies these points, the computer calculates tangents occurring at these points and displays these tangents. X-axis coordinate values for points where two tangents intersect, i.e. temperature values, are then displayed as numerical values in the vicinity of these intersecting points. When this derived data is graphically displayed on a display using analysis apparatus and this is being finished off by adjusting the displaying of a graphical report, it is necessary for the user to make the following designations at the computer.

1) Which type of derived data should be calculated within a plurality of different types of derived data calculations?
2) Which derived data should be calculated within a plurality of data sets? (It is customary to display a plurality of items of data in a superimposed manner for comparison in this analysis. Refer to FIG. 4B).
3) Specifying a necessary parameter for calculating derived data such as calculation range and calculation point.
4) Adjustment after calculating derived data by fine adjusting derived data, preventing derived data and original data from overlapping on the screen and etc.

However, with this related derived data calculating user interface, after selecting whether calculation of the derived data or adjustment of the derived data is to be performed using some kind of known method, the target is then designated (which calculation source data or which derived data). and the operation (derived data calculation or derived data adjustment) is carried out.

There are several methods for selecting calculation of derived data or adjustment of derived data.
(A) A method for allowing a user to specify calculation or adjustment clearly by displaying a selection screen such as a menu.
(B) A method wherein adjustment mode is normally on and a user can specify calculation mode when it is wished to perform calculations.

For example, in the case of method (B), a DSC interpolated melting start temperature calculation is performed. When results for this interpolated melting start point temperature calculation are superimposed with the DSC curve and are displayed in a manner which is difficult to see, the procedure that is performed in the case of adjusting the position of displaying the interpolated melting start temperature calculation results to overcome this is shown in FIG. 5.
(1) A user moves a point on the original DSC curve and clicks. (This enables the calculation source data to be specified.) [Step 1 (S1)]
(2) The user selects interpolated temperature calculation on a menu. (This enables specification of the derived data type to be calculated, and, at this time, the analysis apparatus is in a state capable of receiving a calculation.) [Step 2 (S2)]
(3) An analysis apparatus displays a cursor in the X-Y direction specifying the point on the DSC curve specified in step 1. (This means that a calculating interface is displayed.) [Step 3 (S3)]
(4) A user specify two points (X-Y axis) constituting the origins of the interpolated melting start temperature calculation on the DSC curve using a cursor. (This specifies parameters which are necessary for calculating derived data.) [Step 4 (S4)]
(5) As specified above, an analysis apparatus calculates derived data and numerically displays the calculation results near points of intersection. [Step 5 (S5)]
(6) When interpolated temperature calculations other than interpolated melting start temperature calculations, such as interpolated crystallization start temperature, etc., are successively made using the same DSC curve, (5) and (6) are repeated, and if a desired calculation finishes, the user designates ending of calculations using the menu and calculation mode ends. The analysis apparatus then goes back to adjustment mode. [Step 6 (S6)]
(7) If the derived data calculated need to be adjusted, go to Step 7 (S7). If not, the operation can be terminated.
(8) In this situation, it is necessary to adjust the derived data because the display of interpolated melting start temperatures etc. interferes with the displaying of other DSC curves. An adjustment user interface is therefore prepared where adjustment mode is automatically entered when calculation mode ends. [Step 7]
(9) The user then moves the point for the interpolated melting start temperature displayed numerically and clicks. (This enables derived data to be specified.) [Step 8 (S8)]
(10) The user moves the interpolated melting start temperature display to a place where the DSC curve does not overlap so as not to obstruct graphical display. (This operation is the inputting of adjustment parameters [Step 9 (S9)] and adjustment after calculating the derived data [Step 10 (S10)]).

(11) Operation (9) and (10) are repeated when adjusting of other derived data is carried out and the operation is completed when the adjustment has been done.

When calculating the interpolated melting start temperature for other DSC curves, go back to the start and repeat the operation from (1) to (11).

When analyzing, it is well often desired to create the same type of derived data for a plurality of different data sets to be compared. In the case of the related art, the designation of the necessary parameters [step 4] for calculating a selection [step 2] of a derived data type is carried out after first implementing designation [step 1] as to whether or not to perform calculations on derived data, and which data to perform calculations on. When calculations are then performed for the same derived data with respect to other data, alterations are again performed after designating other interfering data from when calculation/adjustment of the derived data is completed with respect to this data. In the aforementioned example, it is necessary to repeat the operation from (1) to (11) for every DSC curve, so that when calculating derived data for many curves, it takes time to perform the above operation every time.

SUMMARY OF THE INVENTION

It is an object of the present invention to provide a derived data display adjustment system that enables easy operation and makes an operation from data selection to creating a desired graphical display less troublesome and time consuming, at the time of graphical display of a plurality of items of data with the derived data added to the display.

With a derived data display adjustment system of the present invention, when derived data calculation or derived data adjustment is executed, selection of new graph elements to be subjected to derived data calculation or derived data adjustment is possible, with a derived data calculation user interface being displayed when selected graph elements are computable, and with a derived data adjustment user interface being displayed when computation is not possible.

Further, when a graphic element is selected and specified in the analyzing process, a possible process to be performed for said graphic element at the state as set in a computer will be specified, and a user interface to perform said process will be displayed.

BRIEF DESCRIPTION OF THE DRAWINGS

FIGS. 3A–3B are diagrams illustrating a graph display when derived data is interpolated melting starting temperature and A is a graph of one data and B is a graph of a plurality of data.

DETAILED DESCRIPTION OF THE INVENTION

Figure 1:
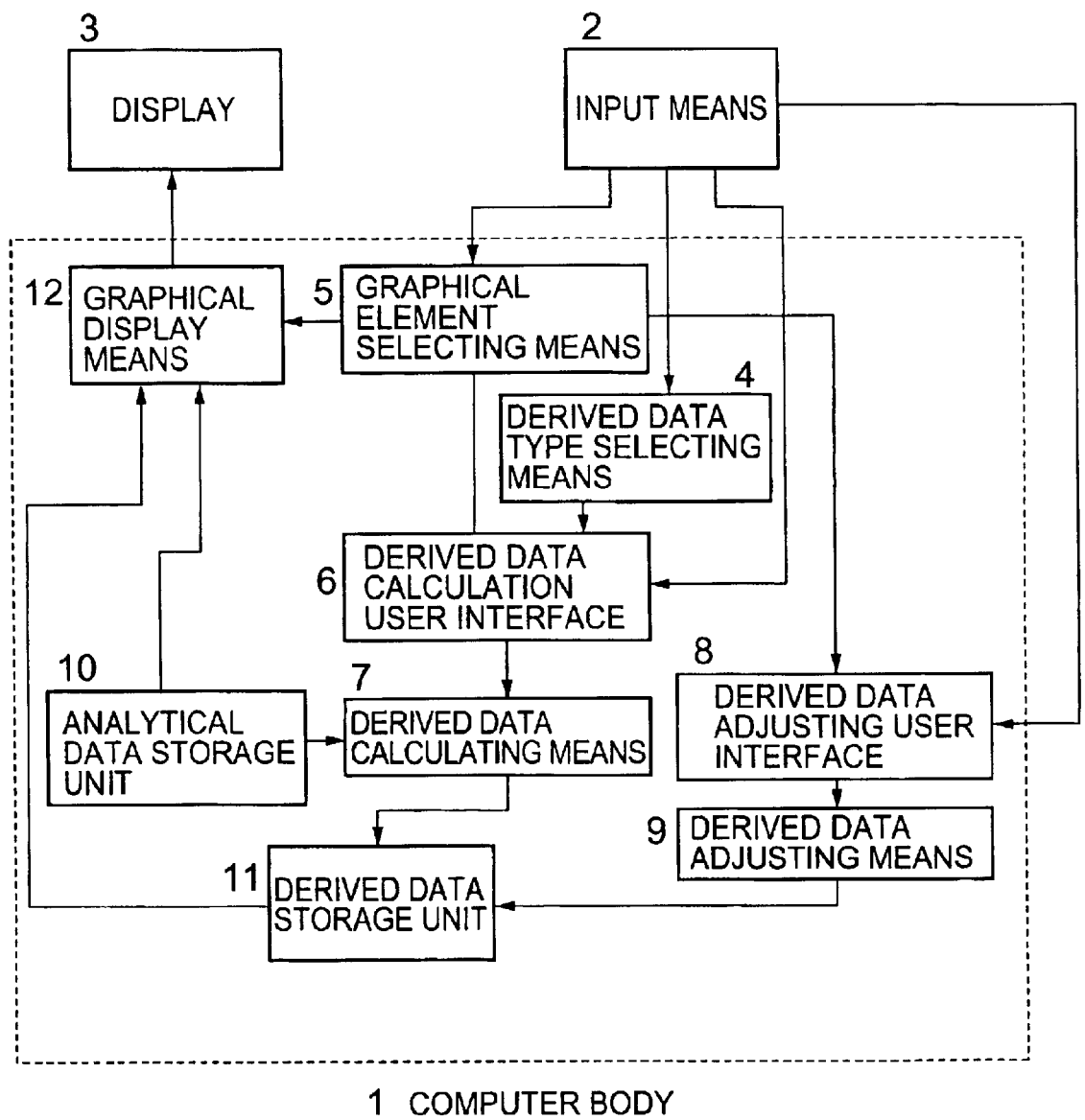
FIG. 1 is a view showing the basic configuration of the derived data display adjustment system of the present invention.

The present invention therefore sets out to provide a derived data display adjustment system that when derived data of a plurality of data is created to be compared, enables a change between a calculation mode or adjustment mode for other derived data at operational turning points and a flexible and easy operation by making operation less restrictive than in the related method where, if an operation for a derived data in calculation mode or adjustment mode is started once, it is impossible to change to any other process in a different mode unless a series of fixed operations of calculation or adjustment are started and finished, so that it is necessary to go back to a first step and repeat a whole process. Namely, a mechanism is provided for making it possible to select graphical elements at a time where a calculation of derived data is made for certain data, with a determination then being made as to whether or not a graphical element selected during this time is data for which derived data calculations are possible. Calculation is possible in cases where this is another data curve and an interface for calculating derived data is therefore displayed as a determination that it is possible to calculate derived data for this data. If, during this time, a selected graphical element is a calculated numerical value display, then the calculation results are for a graphical element for which calculations are not possible. It is therefore determined that an adjustment operation can be achieved, and adjustment mode is therefore gone to so that a derived data adjustment user interface is displayed. In the case where the same type of derived data is made and compared for a plurality of items of data, as is often the case in the operation of an analysis apparatus, it is no longer necessary to return to an initially designation and repeat operations after completion of a series of operations for each item of data as was the case in the related art. Instead, it is possible to perform derived data calculations for other items of data or go to and execute other modes of operation at turning points midway through operations.

Further, in the present invention, when it is wished to calculate the same type of derived data for this data at the time when derived data is calculated for certain data, so that, for example, it is wished to calculate the same type of derived data through calculations of interpolated crystallization start temperature for the same data after calculating the interpolated melting start temperature, if calculation parameters are again inputted to a derived data calculation user interface for designating connection points using a displayed cursor, etc., calculations can be executed promptly. In the present invention is it possible to make designations at turning points of operations for processes enabling selection in setting conditions for a computer so as to make a selection, and it determine to regard what a selection under these conditions is designating in a process flow. This reduces the load placed on the user and dramatically improves operation efficiency compared with the related method.

The basic construction of the derived data display adjustment system according to the present invention is shown in FIG. 1. Reference numeral 1 denotes a computer body, 2 denotes input means such as a mouse, a key board, etc and 3 denotes a display. The computer body 1 includes derived data type selection means 4, graphical element selection means 5, derived data calculating user interface 6, derived data calculating means 7, derived data adjusting user interface 8, derived data adjusting means 9 and also includes an analytical data storage unit 10 for storing analyzed data from a detector (not shown), a derived data storage unit 11 for storing calculated data from the derived data calculating means 7 and adjusted data from the derived data adjusting means 9, and graphical display means 12 for receiving signals from the analytical data storage unit 10, the derived data storage unit 11, and the graphical element selection means 5, and generating a graphical display signal for output to the display 3. A graphical display signal for the analytical data stored at the analytical data storage unit 10 is generated at the graphical display means 12 for graphical display at the display 3 in accordance with a program provided at the computer 1.

Figure 2:
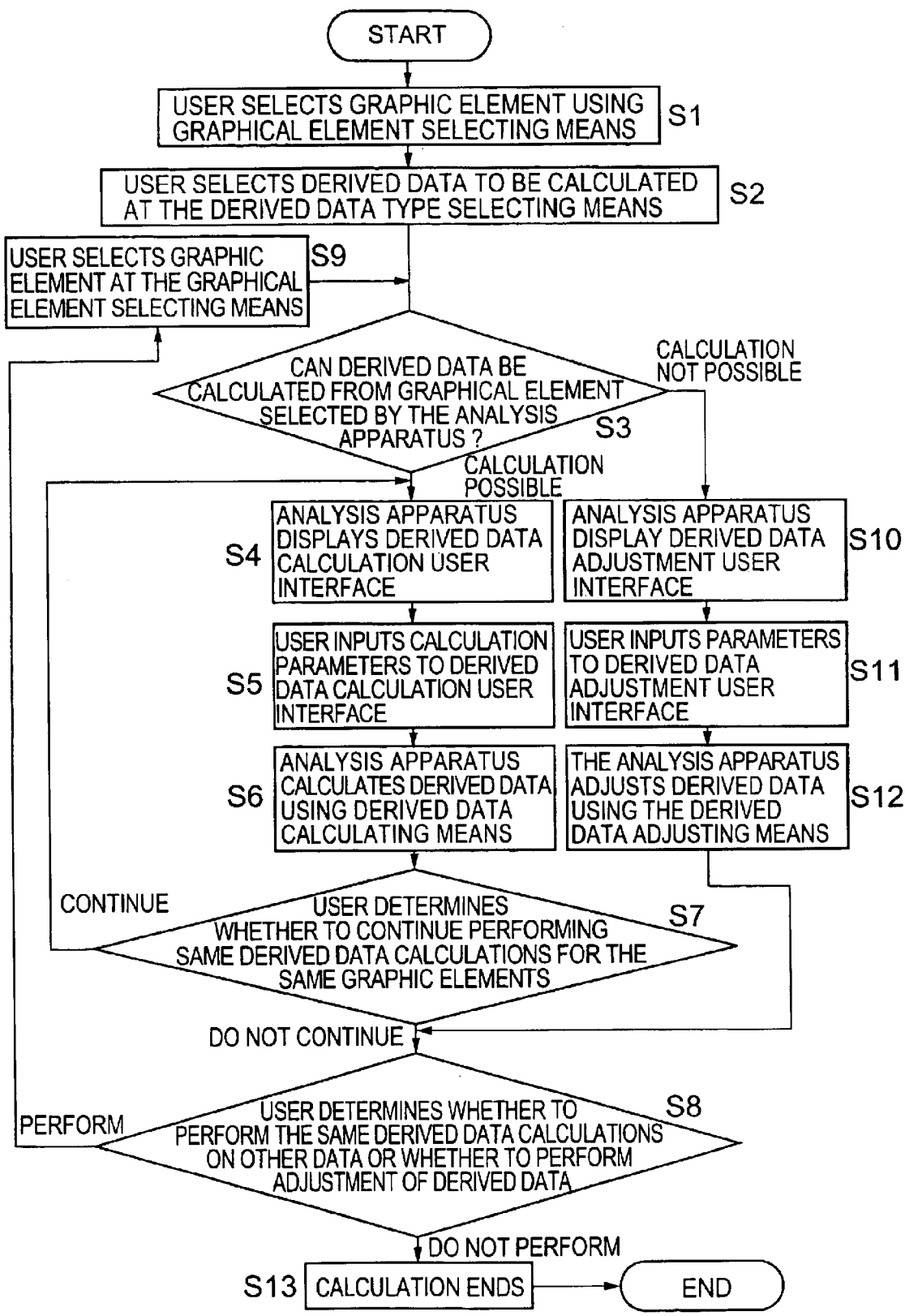
FIG. 2 is a flowchart showing the operation flow of an analysis apparatus of the present invention.

The operation of the present invention will now be described with reference to the flowchart of FIG. 2. When it is wished to specify analytical data stored in the analytical data storage unit 10 and calculate derived data for this data from displayed graphs for the analytical data, first of all, target data is specified by designating through pointing, etc. (graphical element selection means 5) using input means 2 such as a mouse to the data on the screen. [Step 1 (S1)] Next, a menu is displayed and the type of derived data to be calculated is designated (derived data type selection means 4) from the input means 2. [Step 2(S2)] A determination is made as to whether or not the specified graphical element is capable of being subjected to derived data calculations. [Step 3(S3)] When calculation is possible, a derived data calculation user interface 6 is started up and a parameter input screen is displayed. [Step 4 (S4)] When parameters are inputted from the input means 2 at this stage using the derived data calculation user interface 6, [Step 5 (S5)] then a state where calculation is possible is ascertained, the derived data calculation means 7 operates so as to calculate derived data, and the calculation results are stored in the derived data storage unit 11. [Step 6 (S6)] When the same derived data calculations are performed for the same graphical elements at this time, [Step 4] is returned to, the derived data calculation user interface 6 is activated again and the parameter input screen is displayed. If parameters are inputted again anew from the input means 2 to the derived data calculation user interface 6 [Step 5], then [Step 6] is repeated. The following step is then preceded to when the same derived data calculations are not continued for the same graphical elements at this time. [Step 7 (S7)] When the same derived data calculations are not carried out for the same graphical elements, the user determines whether or not the same derived data calculations are to be carried out for other data, or whether adjustment of derived data is to be carried out [Step 8 (S8)]. When this is performed, [Step 9 (S9)] is proceeded to and selection of a new graphical element is performed. [Step 9] When the same derived data calculations are not performed on other data and derived data adjustment is also not performed, calculation completion is designated, calculation mode is ended [step 13 (S13)], and the derived data calculation operation is complete. Further, in [Step 3], when the selected graphical element cannot be subjected to calculations, the derived data adjustment user interface 8 is activated and the parameter input screen is displayed. [Step 10 (S10)] When parameters are inputted from the input means 2 at this stage using the derived data adjusting user interface 8, [Step 11 (S11)] the derived data adjustment means 9 operates so as to adjust the derived data, and the adjustment results are stored in the derived data storage unit 11. [Step 12 (S12)] The aforementioned [Step 8] is proceeded to in order that the user can make a determination as to whether to perform the same derived data calculations on other data at this time or whether to perform adjustment of the derived data. When this is carried out, [Step 9] is returned to, and when this is not carried out, the process ends after passing through [Step 13] as a result of the derived data calculation already having ended.

A main feature of the present invention is that there is provided a function [Step 9] whereby, at the turning point [Step 8] of whether to perform derived data calculations or perform derived data adjustment, when the same derived data calculation is to be performed on other data or adjustment of the derived data is to be performed, it is possible to select graphical elements anew. A further function [Step 3] is also provided whereby when selection of graphical element is carried out, a determination as to whether or not calculation is possible is made automatically at the computer so that it is not necessary for the user to select whether or not to perform a calculation or perform adjustment. The derived data stored at the derived data storage unit 11 is also sent to the graphical display means 12, a display signal for the derived data can be synthesized to give a graphical display in a numerical format at the graphical display means 12 and can then be displayed at the display 3.

Figure 4A:
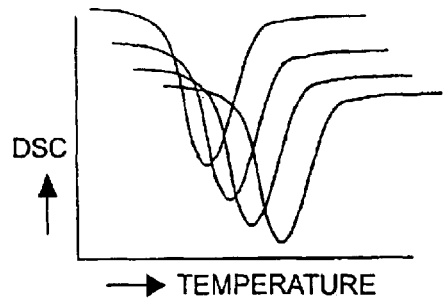
FIGS. 4A–4F are view showing an example where changes in a graphical display in the case of the calculation/adjustment of derived data of the present invention are fore where derived data is interpolated melting start temperatures.
Figure 4B:
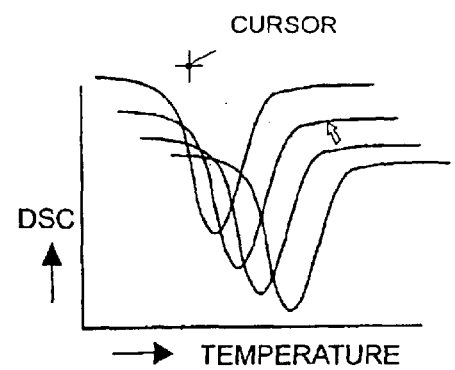

A specific example of a derived data display adjustment system of the present invention is now described giving an example of data for a differential scanning calorimeter constituting a thermal analysis apparatus. The kind of characteristic curve shown in FIG. 4 is obtained by the DSC for each item of data. The display then becomes as shown in FIG. 4B when DSC curves obtained for a plurality of items of data at the analysis apparatus are displayed at the display. There are also demands where interpolation melting start temperatures are calculated for each item of data for comparison and investigation, with it being wished to give notification of this in the form of a graphical display for ease of understanding.

(a) First, the user clicks the DSC curve constituting the calculation source. Data from the plurality of data that is to constitute the current subject of calculation is then specified as the curve shown by the arrow in FIG. 4B.

(b) The user selects interpolated temperature calculation from a menu on the screen. In this way, the operation to be carried out is a derived data calculation/adjustment operation and the type of this derived data is specified as an interpolated temperature calculation.

(c) The analysis apparatus receives the specification of the data that is to constitute the, calculation target and displays an X-Y cursor on the screen. This is achieved by displaying a derived data calculation user interface.

(d) The user then operates the cursor to designate two points for calculating the interpolated melting start temperature. In this case the derived data to be investigated is the interpolated melting start temperature. The two points selected are self-evident as the stabilization point for both sides of the point of inflection of the low temperature side curve and the maximum gradient point for the root diameter DSC curve. This selection is therefore appointed as a user operation. This is achieved through input of the operation parameters.

Figure 4C:
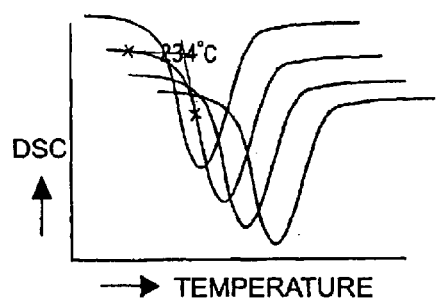

(e) Calculation is then possible when the parameters are specified. The analysis apparatus then draws a line connecting the two points and displays the points of intersection with this line, and displays the temperature constituted by the X-coordinate value in a numerical manner in the vicinity of this point of intersection as shown in FIG. 4C. This is achieved by calculating the derived data. However, the interpolated melting start temperature displayed numerically is displayed in such a manner as to be superimposed with other data curves, making the graph difficult to see. It is therefore wished to move the position. of displaying these numerical values prior to executing interpolated temperature calculations for other data.

(f) In the present invention, the user can select numerical displays for interpolated melting start temperatures on the screen prior to selecting other data curves. This is achieved by the selection of graphical elements.

Figure 4D:
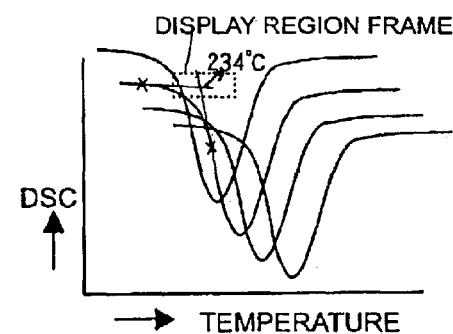

(g) The selected graphical elements are numerical displays for the derived data. The analysis apparatus therefore recognizes this as information indicating that calculation is not possible, changes over to adjustment mode, and displays a rectangular-shaped image region for the numeric display as shown in FIG. 4D. This is achieved by displaying an adjustment user interface when it is determined that calculation is possible.

Figure 4E:
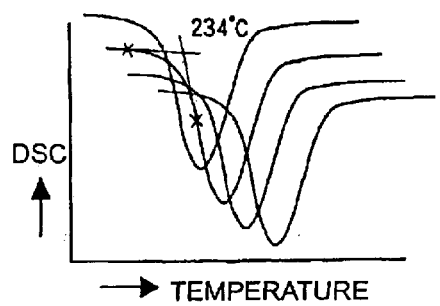
Figure 4F:
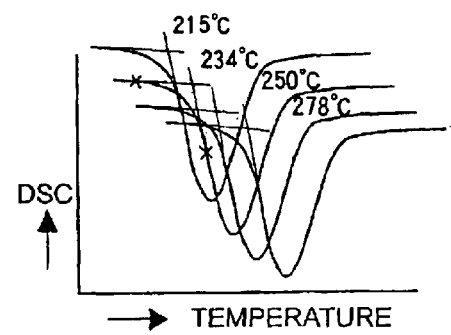
Figure 5:
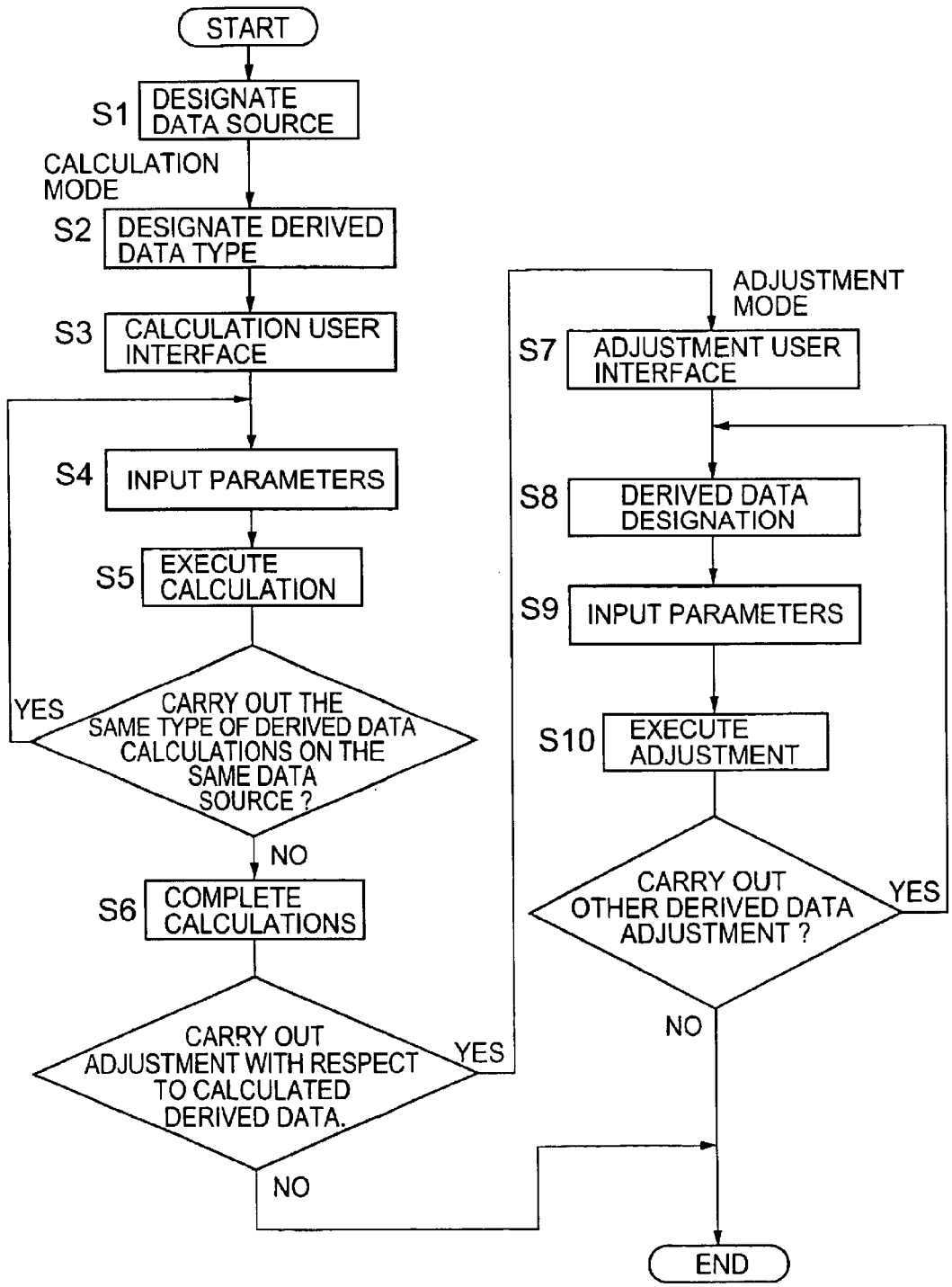
FIG. 5 is a flowchart showing the operation flow of a method of a related graphical display adjustment system.

(h) The user can then drag the rectangular region to a preferred position so that the numerical display does not overlap with the DSC curve, as shown in FIG. 4E. This is achieved by adjusting the derived data. In the above operation, derived data calculation and adjustment is completed for one item of data. The procedure in (a) to (h) is also repeated for other item of data. Finally, a graphical display that is easy to see as shown in FIG. 4F can be made. In the above procedure, that operated by the operator is (a), (b), (d), (f), (h), with (c), (e) and (g) being automatically executed in the process flow of the analysis apparatus. In this embodiment, interpolated melting start temperature of a DSC is given as an example of derived data but a wide variety of other data types may also be adopted. For example, with JIS K7121, in addition to the melting temperature there are a melting peak temperature and an interpolation melting start temperature, giving three types. In addition, a liquid crystal temperature and a glass transfer temperature are also obtained as derived data. Further, in the field of thermal analysis, wit regards to DSC'S, thermogravimetry (TG) and thermomechanical analysis (TMA) etc., a plurality of JIS's are defined according to the object of utilization of a multiplicity of derived data. First order differentiation data and integration data obtained using differentiation or integration operations can also be utilized. There is also derived data decided upon between participants that is not publicly defined. The example described here is not limited in this respect and the present invention may also be applied to calculation and adjustment of derived data for this kind of broader range.

In the derived data display adjustment system of the present invention, when calculation of derived data or adjustment of derived data is implemented in a process of analysis by analysis apparatus, it is possible to select new graphic elements for which it is wished to calculate or adjust derived data. When graphical elements selected during this time may be subjected to calculations, a derived data calculation user interface is displayed. When calculation is not possible, a derived data adjustment user interface is displayed. Transitions between calculating mode and adjustment mode and selection of data to be taken as a target at turning points in the aforementioned operation may therefore be freely executed simply by designating graphical elements on a screen. The operation therefore has a small turn-around compared with the related method, troublesome operations are reduced, the load on the user is alleviated and the desired graphical display can be easily and rapidly made. Further, mode transitions can be easily implemented and in addition to being able to perform adjustment with respect to the displaying of derived data that interferes with displaying of other data, derived data calculation operations for the other data are entered and the burden placed on the user (stressfulness) is alleviated.

Further, in the present invention, when the selected graphical elements are data curves, when the derived data is displayed, a moveable derived data display region is also displayed so that when a graphical element is selected with a cursor, with the conditions set at the computer, a user interface corresponding to executable processing is displayed for this graphical element, and an instruction operation that specifies the operating mode simply by specifying the graphical element may be carried out. This reduces the labor involved and dramatically reduces the burden placed on the operator.

What is claimed is:

1. A derived data display adjustment system for a sample analyzer having computer which enables user selection of a certain characteristic curve from a plurality of displayed characteristic curves to be subjected to derived numerical data calculation or derived numerical data position adjustment, comprising: a display screen for displaying the plurality of characteristic curves and a plurality of derived numerical data values calculated from the plurality of characteristic curves; means for displaying a derived numerical data calculation user interface on the display screen to enable user selection of a derived numerical data calculation process for calculating a derived numerical data value from one of the characteristic curves when the characteristic curve is selected by the user; means for displaying a derived numerical data adjustment user interface on the display screen to enable user adjustment of a display position of a derived numerical data value when the derived numerical data value is selected by the user; and means for determining whether the derived numerical data calculation process is possible when one of the characteristic curves or one of the derived numerical values is selected by a user to and displaying one of the derived data calculation user interface and the derived data adjustment user interface based on the determination result.

2. A derived data display adjustment system according to claim 1; wherein the derived numerical data calculation user interface comprise a cursor displayed on the display screen adjacent to the selected characteristic curve.

3. A derived data display adjustment system according to claim 1; wherein the derived numerical data adjustment user interface comprises a user-movable display region displayed on the display screen when a derived numerical data value is selected.

* * * * *